United States Patent [19]
Gragg et al.

[11] Patent Number: 5,754,207
[45] Date of Patent: May 19, 1998

[54] VOLUME INDICATING INK RESERVOIR CARTRIDGE SYSTEM

[75] Inventors: Brian D. Gragg; George T. Kaplinsky; Tofigh Khodapanah. all of San Diego; David W. Swanson. Escondido, all of Calif.; James E. Clark. Albany, Oreg.

[73] Assignee: Hewlett-Packard Company. Palo Alto, Calif.

[21] Appl. No.: 546,387

[22] Filed: Oct. 20, 1995

Related U.S. Application Data

[63] Continuation-in-part of Ser. No. 240,297, May 9, 1994, which is a continuation of Ser. No. 929,615, Aug. 12, 1992, abandoned, and a continuation-in-part of Ser. No. 302,077, Sep. 7, 1994, Pat. No. 5,541,632, which is a continuation of Ser. No. 928,811, Aug. 12, 1992, abandoned.

[51] Int. Cl.⁶ .............................. B41J 2/175; B41J 2/195
[52] U.S. Cl. .......................................... 347/86; 347/7
[58] Field of Search ................................ 347/85, 86, 87, 347/92, 7

[56] References Cited

U.S. PATENT DOCUMENTS

| | | | |
|---|---|---|---|
| 4,301,459 | 11/1981 | Isayama et al. | 347/92 |
| 4,771,295 | 9/1988 | Baker et al. | 347/87 |
| 5,280,300 | 1/1994 | Fong et al. | 347/87 |
| 5,359,353 | 10/1994 | Hunt et al. | 347/86 |
| 5,426,459 | 6/1995 | Kaplinsky | 347/87 |

FOREIGN PATENT DOCUMENTS

| | | | |
|---|---|---|---|
| 60-32667 | 2/1985 | Japan | 347/7 |
| 63-252747 | 10/1988 | Japan | 347/7 |

*Primary Examiner*—Benjamin R. Fuller
*Assistant Examiner*—Judy Nguyen

[57] ABSTRACT

In a computer-driven ink-jet printer, a carriage-borne ink reservoir system adjacent a print head, having a housing and a movable wall within and in sealing contact with the housing, the movable wall being observable and forming a portion of a variable volume ink chamber within the housing, the position of the movable wall being related to the volume of ink contained in the carriage-borne ink reservoir.

23 Claims, 4 Drawing Sheets

VOLUME INDICATING INK RESERVOIR CARTRIDGE SYSTEM

CROSS REFERENCE TO RELATED APPLICATIONS, IF ANY

This application is a continuation-in-part of U.S. Ser. No. 08/240,297 filed May 9, 1994 which is a continuation of U.S. Ser. No. 07/929,615 filed Aug. 12, 1992, abandoned, and also is a continuation-in-part of U.S. Ser. No. 08/302, 077 filed Sep. 7, 1994, U.S. Pat. No. 5,541,632, which is a continuation of U.S. Ser. No. 07/928,811 filed Aug. 12, 1992, abandoned, the disclosures of Ser. No. 08/240,297 and Ser. No. 08/302,077 being each incorporated herein by reference. This application is related to applicant's U.S. patent application Ser. No. 08/545,964, entitled INK VOLUME SENSING AND REPLENISHMENT SYSTEM filed concurrently herewith, the disclosure of which is also incorporated herein by reference.

BACKGROUND OF THE INVENTION

1. Field of the Invention

The present invention relates generally to ink cartridges for high speed computer-driven printers such as ink jet printers and plotters. More particularly, the invention relates to an ink cartridge allowing a high flow rate and more accurate monitoring of an ink level in a ink reservoir within the cartridge adjacent a print head, and replenishment of ink in such a cartridge.

2. Description of the Related Art

The ink reservoir of a print head ink cartridge is ordinarily maintained at a sub-atmospheric or "negative" pressure so that ink will not leak or drool from the print head. Various types of ink reservoirs are commonly used, including refillable ink reservoir cartridges which are "on-board" i.e. mounted on the movable printer carriage, throwaway replaceable cartridges, and remote or "off-board" ink reservoirs from which ink is drawn to the print head by tubing. In the later case it is desirable to have some ink reservoir capacity "on-board" the printer carriage, to allow continuous printing regardless of variations in flow and pressure of ink to the print head from the off-board ink supply. Further information regarding on-board cartridges can be found in U.S. Pat. Nos.: 5,280,300 issued Jan. 18, 1994 to Fong, et al.; 5,325,119 issued Jun. 28, 1994 to Fong; and 5,359,353 issued Oct. 25, 1994 to Hunt, et al., all of which are assigned to the assignee of the present application and are incorporated herein by reference.

It has been found desireable to provide an on-board ink reservoir cartridge having a relatively high flow rate to the print head from the on-board reservoir. It has also been found to be desireable to monitor the volume of ink in such an on-board ink reservoir to effect appropriate replenishment of the on-board ink reservoir from an off-board ink supply. These features give rise to a system which can print at high speeds and employ an off-board ink supply, as the on-board reservoir provides high ink flow capacity for short intervals, and the ink volume in the on-board reservoir can be kept at an adequate amount. It is to this end that the invention is directed.

SUMMARY OF THE INVENTION

The present invention accordingly provides a carriage-borne ink reservoir for a computer-driven printer comprising a housing having an interior variable volume ink chamber. Within the housing is a movable wall of said ink chamber, said moving wall being in sealing contact with the housing and forming a portion of the walls comprising the variable volume ink chamber and biased to a position whereat the maximum interior volume within the interior ink chamber is obtained, the volume of said ink chamber being related to the volume of ink in said carriage-borne ink reservoir.

In a more detailed aspect, opposite the movable wall is a filter through which ink may pass from the variable volume ink chamber and then to a print head.

In a further detailed aspect a discontinuity in the housing comprises a viewing location, through which there is a sight path from a first to a second side of the housing, and through which a position of an ink level indicator, which can comprise said movable wall, is observable at said viewing location from a position outside of said housing. The movable wall is biased to move in a direction tending to enlarge the volume of said interior ink chamber. The present position of the ink level indicator is related to the position of the movable wall and is related to the present volume of ink in said carriage-borne ink reservoir. The position of the indicator can be sensed from outside the ink reservoir by way of the viewing location.

DESCRIPTION OF THE PREFERRED EMBODIMENTS

Figure 1:
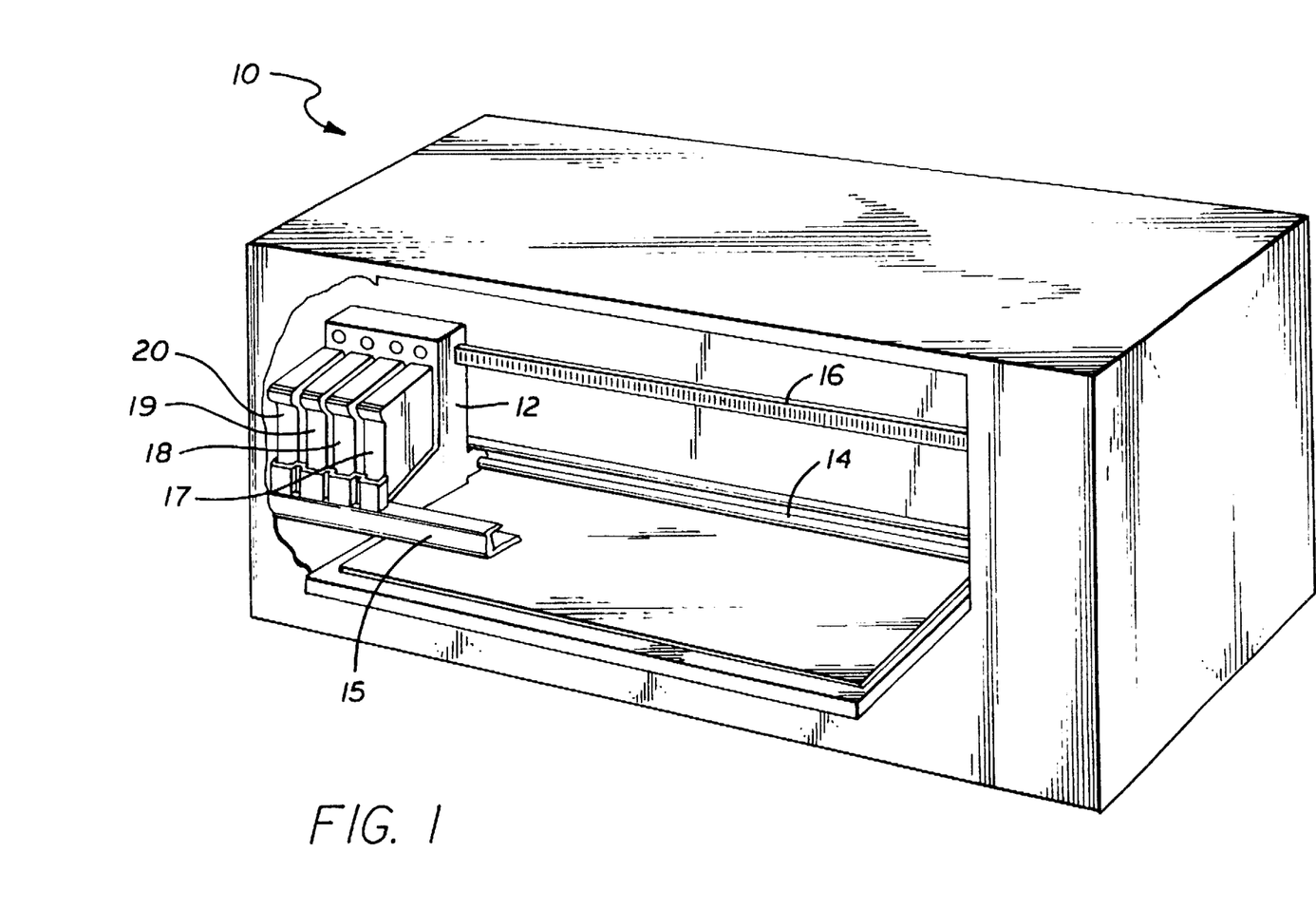
FIG. 1 is a perspective view of a computer controlled printer, illustrating the environment of the present invention.

With reference to FIG. 1, a computer-driven ink jet printer 10 includes a carriage 12 slidably supported on supports 14 and 15, and an encoder bar 16 which in conjunction with an optical scanner (not shown) monitors the position of the carriage. On-board print head and ink reservoir cartridges 17, 18, 19, and 20, are mounted on the carriage and each contain one of the colors (cyan, magenta, or yellow for example) customarily used in color printing, or black ink, enabling color printing and black only printing. For purposes of this discussion reference will be made to a single ink cartridge 20, but it will be apparent that the discussion is applicable to any or all of the ink cartridges shown.

Figures 2, 4:
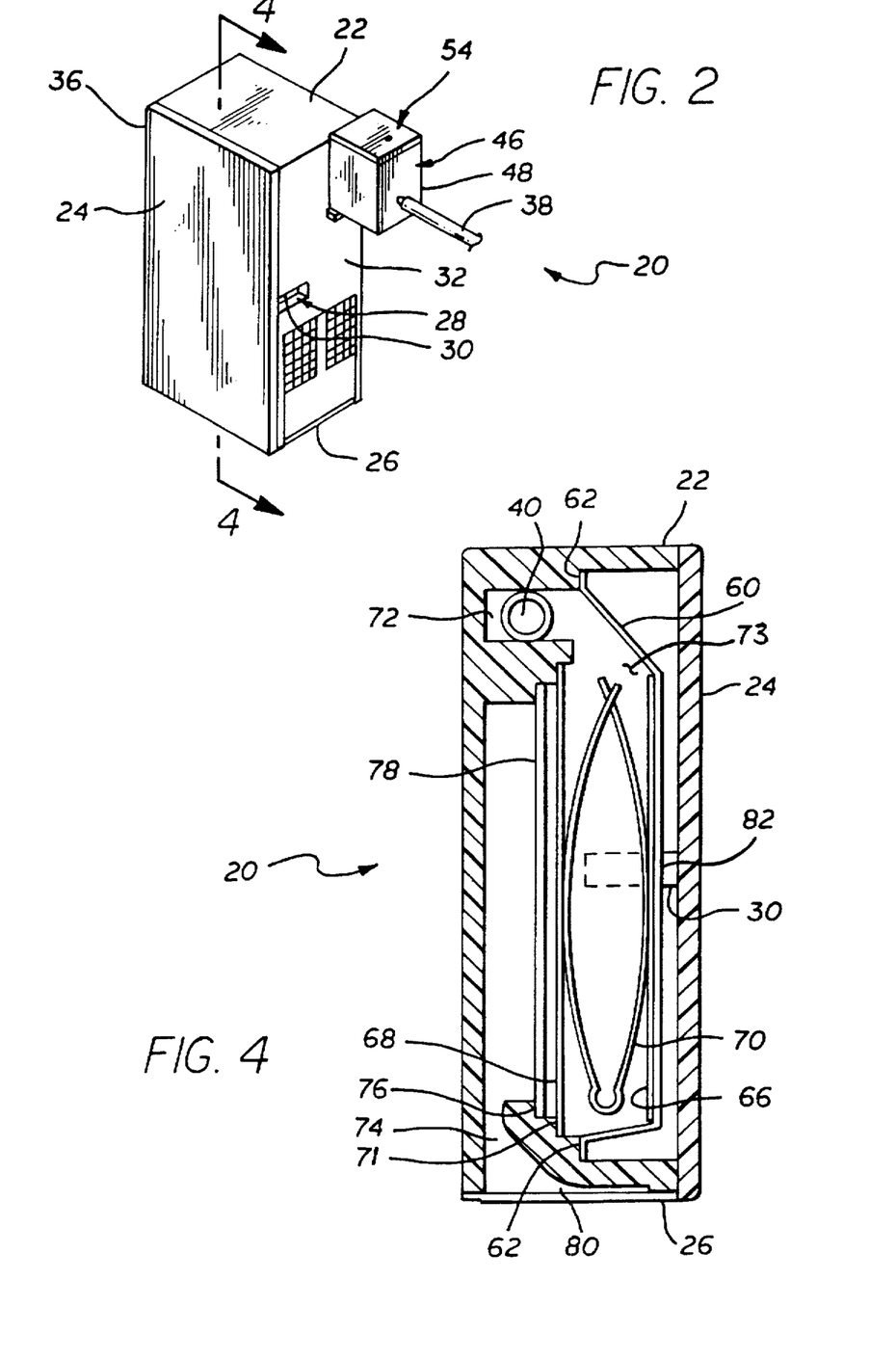
FIG. 2 is a perspective view of a print head ink cartridge for a thermal ink jet printer incorporating an ink reservoir of the invention.
FIG. 4 is an elevational cross section of the cartridge of FIG. 2, taken along line 4—4 in FIG. 2.

An ink cartridge of the invention is seen in FIG. 2 to comprise a molded rigid plastic resin outer housing 22, having a cover plate 24 intended to be affixed, as by cementing or welding, to the remainder of the housing. The cartridge has an ink discharge aperture in its lowermost end wall (not shown) to which is affixed an electrically driven print head 26. A viewing location 28 is defined by a discontinuity in the housing 22 defined by a first slot 30 in a first side 32, and, as can be seen in FIG. 3, a second slot 34 aligned with the first slot, which allows a line of sight through the housing from the first side to a second, opposite, side 36.

Figure 3:
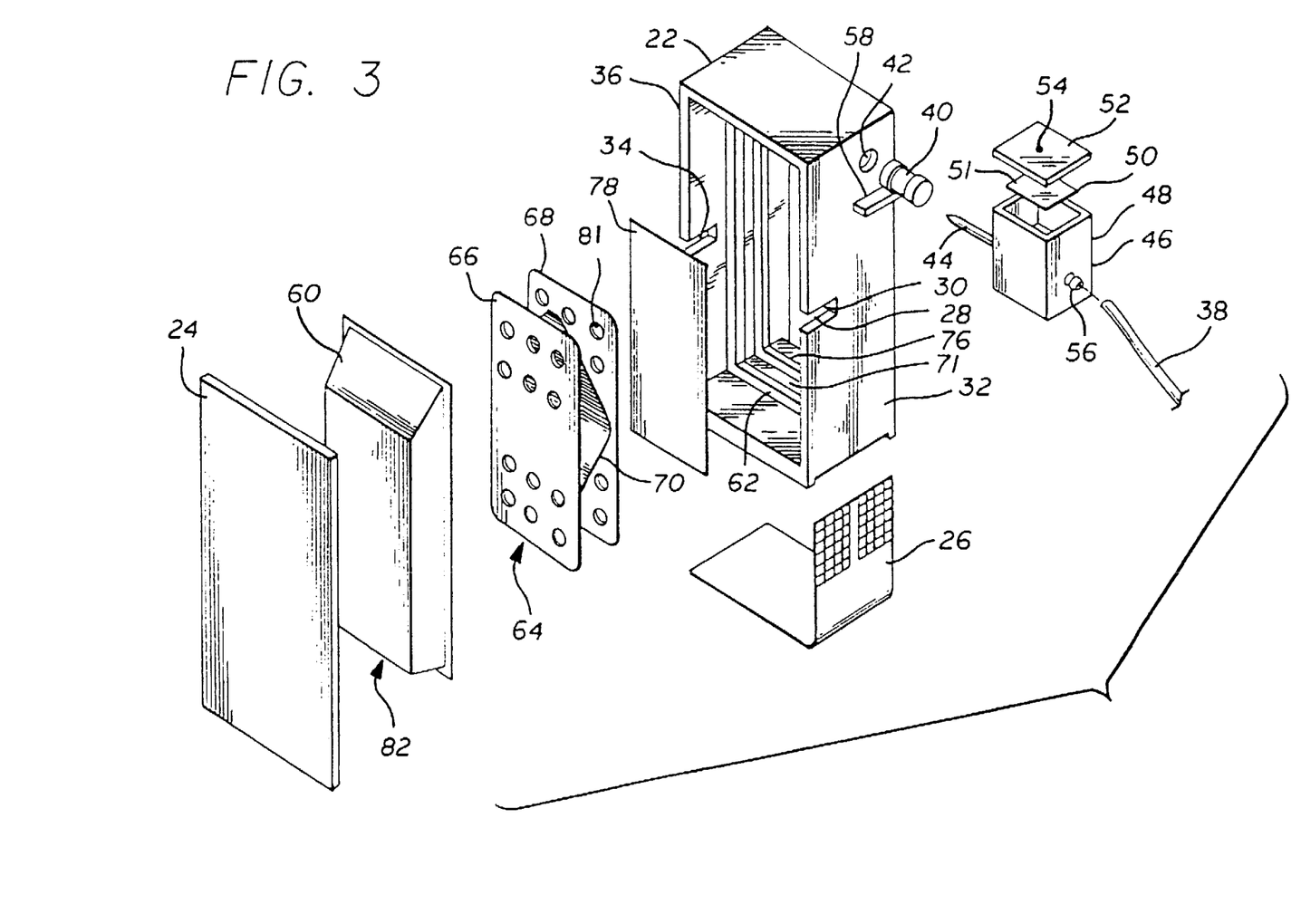
FIG. 3 is an exploded perspective view of the ink cartridge of FIG. 2 containing a collapsible reservoir structure.

With reference now to both FIGS. 2 and 3, an ink supply line 38 can be connected to the cartridge 20 via a connector, which in this exemplary embodiment comprises a septum 40 formed of an elastomeric material and disposed in an opening 42 in the housing 22, and a needle 44 adapted to pierce the septum. This connector gives a connection capability free of contamination by air or other impurities. A capillary tube comprising the inner lumen (45 in FIG. 5) through the needle also acts as a flow limiter and a pressure and flow fluctuation limiter or damper with respect to ink replenishment of the on-board reservoir from the flexible supply line 38. The septum can be pre-slit to allow connection of a needle with a relatively blunt point, and the septum can be compressively loaded to effect a seal of the slit or any opening formed therethrough by insertion of the needle 44 when the needle is withdrawn.

An air accumulator 46 can be incorporated in the ink supply line 38 adjacent the connector needle 44 to trap any air that may transit the ink supply line 38, and comprises a riser 48 and an air valve 50 formed of a porous membrane which allows air to pass therethrough, but will not allow ink or other liquids to pass through. A layer 51 of liquid over the membrane prevents air from entering the accumulator in the reverse direction, even if a sub-atmospheric pressure exists within the accumulator. A relatively viscous non-volatile liquid, such as glycol for example, is used to cover over the membrane in this way. A cover plate 52, incorporating a small opening 54 to allow escape of air, closes the top of the riser 48. Alternatively, or in addition, to the provision of the layer 51 of liquid, a check valve (not shown), such as a flapper or duck-bill valve, biased to a closed position, can be provided. The check valve controls the opening 54 on the cover plate to allow escape of air from the riser and prevent air from being drawn into the riser if the pressure in the riser drops below atmospheric. In a further alternate embodiment (not shown), in place of the membrane one-way air valve a float valve could be employed, and, as will be apparent, a biased closed check valve such as described above must also be used therewith to prevent introduction of air into the riser when a vacuum is drawn on the interior of the riser sufficient to overcome the buoyancy of the float of such a valve.

Again referring to the illustrated embodiment, a ribbed tubular connection portion 56 of the riser 48 allows connection of the flexible ink supply line 38 to the riser. The needle 44 can advantageously be formed of the same material as the riser 48, for example of a polymeric resin, but can also be formed of a different material, such as a metal for example. Since it is essential that the riser remain relatively upright for the air accumulator to function properly in trapping air, a ledge 58 can be incorporated in the housing to prevent rotation of the air accumulator around a central axis of the needle connector, or the carriage 12 can be made to cooperate with the cartridge 20 to prevent such rotation.

With reference now to FIGS. 3 and 4, an inner ink reservoir structure formed within the housing 22 is comprised of a relatively rigid plastic frame formed in this case by the housing, and a flexible impervious ink bag membranous sheet 60, attached thereto by heat bonding peripheral edges of the membranous sheet to an inner periphery of the housing. An outermost ledge 62 of a series of three concentric ledges is provided around the interior of the housing for this purpose. The inner ink reservoir structure preferably contains a pressure regulator 64 which in turn is comprised of a pair of spaced substantially parallel plates 66, 68 urged apart by a spring 70 into engagement with the flexible membranous sheet 60 and a further concentric ledge 71. A chamber of variable volume is thus formed within the housing, which chamber is in fluid communication with the connector septum 40 via a channel 72 formed in the housing, and the print head via a further channel 74. An entrance to said further channel to the print head is defined by an innermost concentric ledge 76, and a filter 78 is supported thereby and attached thereto at its peripheral edges preventing impurities from entering. The configuration of the invention allows a filter of relatively large cross-sectional area to be employed, giving rise to commensurately relatively higher ink flow capacities therethrough. The lowermost portion of the outer housing 22 (as viewed in FIG. 4) is provided with an ink discharge aperture 80 through which ink is downwardly discharged from the channel 74 leading from the filter 78 to the print head 26.

The pressure regulator side plates 66, 68, best seen in FIG. 3, are of generally rectangular configuration with rounded corners to avoid damaging the flexible ink bag membranous sheet 60. One or more openings 81 is provided in each plate to allow ink to flow therethrough to the filter 78 in the assembled ink reservoir. The pressure regulator is reversible, facilitating assembly.

When assembling the cartridge 20, after installing the septum 40 and print head 26, the filter 78, pressure regulator 64, membranous sheet 60, and cover plate 24 are attached in that order. As will be apparent, the concentric ledges 62, 71, and 76 and stacked component arrangement make the inner ink reservoir very easy to assemble. Prior to or simultaneous with attachment of the membranous sheet 60, to the housing 22, the regulator 30 is placed in position and pre-loaded by collapsing it partially against the spring force such that it initially occupies in a prestressed collapsed condition a volume inside the inner ink reservoir bag formed by the housing 22 and membranous sheet 60. The amount of this pre-stressing and, as will be apparent, a biasing force on the flexible membranous sheet is readily controllable by the designer by selecting the desired degree of compression of the spring regulator 64.

The flexible membranous sheet 60 and a side plate 66 of the regulator 64 forms a movable wall 82 of the inner ink reservoir, and this movable wall gradually moves towards the housing 22 as the reservoir is evacuated of ink. The movable wall is visible along a line of sight comprising a light pathway through the slots 30, 34 defining the discontinuity in the housing forming the viewing location 28. The membranous sheet 60 is sized with enough extra membranous sheet material near their edges of attachment to the outermost concentric ledge 62 of the housing 22 that the wall is freely movable with the side plate between full and empty positions as best indicated in FIG. 4. It will be appreciated that when an inner ink reservoir formed by the housing 22 and the inner membranous sheet 60 is filled with ink, the movable wall 82 and the inner ink reservoir will appear as an ink level comprising an opaque obstruction in a line of sight through the housing at the viewing location 28.

Ideally, both side plates 66, 68 and the spring 70 are made of a non-corrosive metal such as stainless steel sheet and the housing 22 and ink bag membranous sheet 60 are made of inert plastics which do not react with print ink.

By observation of the movable wall 82 at the viewing location 28, a present ink volume in the inner ink reservoir can be determined. Although the position of the movable wall and ink volume are related, and that functional relationship is non-linear. As will be apparent, ink volumes corresponding to relative locations of the movable wall and the cartridge housing 22 are easily obtained for a particular size and configuration of ink cartridge 20 by measuring the volume of liquid in the reservoir at various points along the range of movement of the movable wall with respect to the housing, and from that collected data the functional relationship of relative wall location to volume is synthesized. Alternatively, the relationship can be mathematically modeled, for example by use of computer-aided modeling techniques.

This functional relationship, subsequently embodied in stored processing steps of a printer controller (not shown), or a "look-up table" in permanent memory of such a controller, for example, or by other known means incorporated in the printer, allows monitoring of ink volume in the inner ink reservoir of an ink cartridge. For example, a photosensor (not shown) adjacent the first side 32 of the ink cartridge 20 detecting light projected through the viewing location from adjacent the second side 36 of the cartridge could indicate the location of the movable wall 82 with respect to the ink cartridge 20 at a present time instant at which the movable wall passes through and interrupts the projected light as the carriage 12 moves the ink cartridge past the light and photosensor. The position of the ink cartridge 20 can be inferred from the position of the carriage, which is determined continuously in relation to the encoder bar 16 in normal printer operation. The relative positions of the ink cartridge housing 22 and the movable wall 82 being known for the same time instant, the corresponding ink volume at that time instant is determined by a controller according to the prior-determined functional relationship. Alternatively, or in addition, to this exemplary method of sensing the ink level in the ink cartridge, the direction and speed of carriage motion is monitored in conjunction with the length of time segments when the photosensor detects projected light, and when it does not, as the ink cartridges 17, 18, 19, 20 passes by. The relative positions of the movable wall 82 and the cartridge 20 are derived from this data, and the ink volume subsequently determined. Replenishment of ink in the on-board reservoir can then be appropriately effected.

While an embodiment with one movable wall 82 has been described, it will be apparent that a cartridge 20 having two opposed movable walls (not shown) can also be used. Such an alternate embodiment will also necessarily have two viewing locations, one for each movable wall, and the volume of stored ink will be related to the distance between opposed walls.

Figure 5:
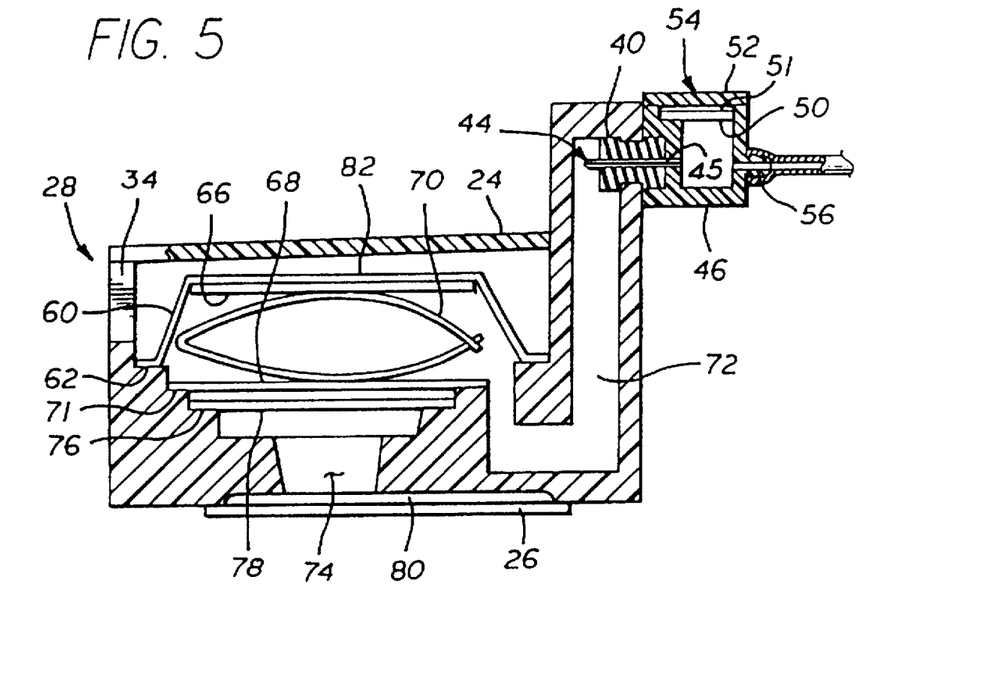
FIG. 5 illustrates a further embodiment of the invention, being an elevational cross section of the cartridge of FIG. 6 partially in cut-out, taken along line 5—5 in FIG. 6.
Figure 6:
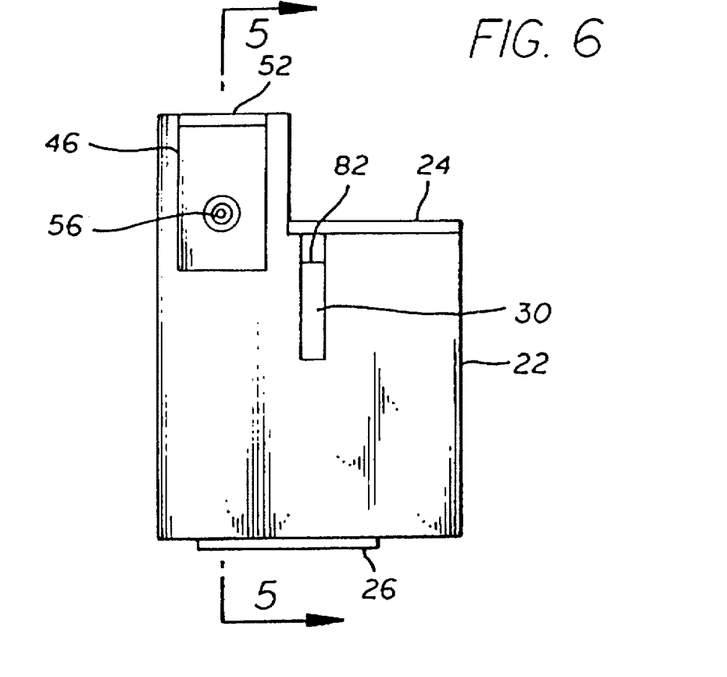
FIG. 6 is an elevational view of the cartridge of FIG. 5, as seen from the right side of the cartridge as viewed in FIG. 5.

With reference to FIGS. 5 and 6, a further alternate embodiment of the ink cartridge 20 of the invention is provided by orienting the movable wall 82 horizontally. Here like reference numbers refer to corresponding elements in the previously described embodiment, and in general the above discussion applies to the description and operation of this second embodiment. However, the movable wall now moves vertically, and hence orthogonally to an axis of motion of the carriage 12 and the mounted ink cartridge 20. In this embodiment the position of the movable wall can be detected with a linear array of discrete photosensors (not shown) oriented vertically.

Or, in another exemplary embodiment, a single photosensor is located so as to trip when the movable wall drops below a predetermined level corresponding to a minimum ink volume to be maintained. The sensing of a low volume in turn triggers replenishment of the on-board reservoir with a predetermined volume of ink corresponding to the difference between the minimum volume and a "full" volume when the on-board reservoir would be completely full but for a reserve capacity (to accommodate, for example, unintended variations in replenishment volume).

From the forgoing it will be apparent that a carriage-borne, or "on-board," ink reservoir is provided which can be monitored with regard to an ink level and/or the ink volume contained therein. This facilitates appropriate replenishment of the on-board ink supply.

Persons skilled in the art will readily appreciate that various modifications can be made from the presently preferred embodiments of the invention disclosed herein and that the scope of protection is intended to be defined only by the limitations of the appended claims.

We claim:

1. An ink reservoir cartridge system for a computer-driven printer comprising:

a rigid housing forming an enclosure having an inner surface and, having an inner periphery and an ink channel in fluid communication with a print head;

a flexible air impervious membranous sheet having a first side and a second side and peripheral edges, sealingly bonded adjacent said peripheral edges to said inner periphery of said housing, forming with said housing an ink reservoir chamber of variable volume within said housing formed in part by said membranous sheet and in part by said rigid housing, said chamber of variable volume having a inner surface comprising the second side of said membranous sheet and another inner surface comprising a portion of said inner surface of the enclosure formed by said rigid housing;

a pressure regulator disposed within said ink reservoir chamber of variable volume between said another inner surface comprising a portion of said inner surface of tie enclosure formed by said rigid housing and said second side of said membranous sheet, said pressure regulator comprising first and second plates biased apart by a spring disposed between said plates, said pressure regulator being held in a compressed state where said spring exerts pressure on said plates, said first plate being in force transmitting contact with said another inner surface comprising a portion of said inner surface of the enclosure formed by said rigid housing and said second plate being in force transmitting contact with said second side of said membranous sheet, whereby said ink reservoir chamber of variable volume is biased to a greatest possible interior volume by said pressure regulator, giving rise to a sub-atmospheric pressure within said ink reservoir chamber, and where said membranous sheet is moveable with respect to said rigid housing, and said first side of said membranous sheet has a position within said rigid housing with respect to said rigid housing, said position providing an indication of ink reservoir volume within said ink reservoir chamber of variable volume.

2. The ink reservoir cartridge system of claim 1, further comprising a filter disposed intermediate said ink reservoir chamber of variable volume and said ink channel in communication with said print head, said filter allowing filtered ink flow therethrough into the ink channel.

3. The ink reservoir cartridge system of claim 1, wherein a position of said membranous sheet is observable through said housing.

4. A carriage-borne ink reservoir system for a computer-driven printer having a movable carriage movable in two opposite parallel directions along a single pathway of finite length within said computer-driven printer, comprising:

a housing having a first side and a second side and an interior ink chamber of variable volume; a viewing location comprising a first opening on said first side where light can pass through said first side of housing and a second opening on said second side where light can pass through said second side of said housing whereby a line of sight is afforded through said housing through said first side and said second side allowing an observation through said housing from said first side through said second side;

an ink level indicator comprising a movable wall in sealing engagement with said housing and in fluid communication with said interior ink chamber wherein said line of sight is parallel to a major surface of said moveable wall;

a spring biasing said movable wall to enlarge a volume of said interior ink chamber of variable volume; a present position of said ink level indicator wall being observable at said viewing location from a position outside said housing, said present position being related to a present volume of ink in said interior ink chamber.

5. The carriage-borne ink reservoir system of claim 4, further comprising a connector carried by said housing and configured to facilitate connection of a fluid conduit thereby allowing fluid to be added to said carriage-borne ink reservoir through said connector; and an off-board ink reservoir positioned in a stationary position with respect to said carriage-borne ink reservoir, said off-board ink reservoir being in fluid communication with said carriage-borne ink reservoir via said fluid conduit.

6. The carriage-borne ink reservoir system of claim 4, wherein said movable wall comprises a flexible air-tight membranous sheet.

7. The carriage-borne ink reservoir system of claim 4, further comprising an ink supply conduit in fluid communication with said interior ink chamber.

8. The carriage-borne ink reservoir system of claim 4, wherein said housing moves parallel to, and commensurate with, movement of said carriage on which said housing is carried, and wherein said movable wall moves with respect to said rigid housing in a direction parallel to a direction of movement of said housing and carriage.

9. The carriage-borne ink reservoir system of claim 4, wherein said housing moves parallel to, and commensurate with, movement of the carriage on which said housing is carried, and wherein said movable wall moves with respect to said housing in a direction orthogonal to a direction of housing movement.

10. The carriage-borne ink reservoir system of claim 5, wherein said connector comprises a needle and septum.

11. The carriage-borne ink reservoir system of claim 5, further comprising a flow limiter carried by said housing.

12. The carriage-borne ink reservoir system of claim 11, wherein said flow limiter comprises a restriction having a smaller cross-sectional area than a cross-sectional area of said fluid conduit.

13. The carriage-borne ink reservoir system of claim 12, wherein said connector comprises a septum and said flow limiter, said flow limiter being in the form of a needle, and wherein said restriction comprises an inner lumen of said needles said inner lumen of said needle being of smaller cross-section area than said cross-sectional area of said fluid conduit.

14. The carriage-borne ink reservoir system of claim 6, further comprising
a plate within said interior ink chamber biased against said movable wall by said spring.

15. The carriage-borne ink reservoir system of claim 6, further comprising an air accumulator in fluid communication with said ink supply conduit.

16. The carriage-borne ink reservoir system of claim 15, further comprising an air valve in fluid communication with said air accumulator, said air valve being configured to allow an escape of air from said air accumulator in fluid communication with said ink supply conduit and to prevent escape of ink.

17. The carriage-borne ink reservoir system of claim 16, wherein said air valve comprises a porous membrane.

18. An ink reservoir cartridge system for a computer-driven printer comprising:

a rigid housing having a first side and a second side, a discontinuity comprising a viewing location whereby a line of sight is afforded from said first side through an interior portion of said housing to said second side, an inner periphery, and an ink channel in fluid communication with a print head;

a flexible air impervious membranous sheet having peripheral edges, sealingly bonded to said inner periphery of said housing, forming with said housing an ink reservoir chamber of variable volume within the housing and said flexible air impervious sheet forming at least a part of a movable wall constituting an ink level indicator;

a pressure regulator disposed within said ink reservoir chamber of variable volume between said housing and said membranous sheet, said pressure regulator comprising a first plate and a second plate biased apart by a spring disposed between said first plate and said second plate, the first plate being configured to allow fluid flow past when the pressure regulator is positioned in-between said housing and membranous sheet and the second plate cooperating with said flexible impervious membranous sheet to form said movable wall;

said pressure regulator being held in a compressed state where said spring exerts pressure on said first plate and said second plate, said first plate being in force transmitting contact with said housing and said second plate being in force transmitting contact with said membranous sheet, whereby said ink reservoir chamber is biased to a greatest possible interior volume by said pressure regulator, giving rise to a sub-atmospheric pressure within said ink reservoir chamber, a position of said ink level indicator being observable at said viewing location from a position outside of said housing, said indicator position being related to a volume of ink in said ink reservoir chamber.

wherein, said line of sight is parallel to a major surface of said movable wall.

19. The ink reservoir cartridge of claim 18, further comprising a filter disposed intermediate said pressure regulator and said housing, said filter allowing filtered ink flow therethrough into said channel in communication with said print head.

20. A carriage-borne ink reservoir system cartridge for a computer-driven printer comprising:

a housing having a first side and a second side and an interior ink chamber;

a viewing location comprising a first window opening on said first side where light can pass through said first side of said housing and a second window opening on said second side where light can pass through said second side of said housing, whereby a line of sight is afforded through said housing through said first side and said second side allowing an observation through said housing from said first side through said second side;

a movable wall comprising a flexible membranous sheet in peripheral sealing engagement with said housing and in fluid communication with said interior ink chamber;

a wall plate being positioned portion to urge against said flexible membranous sheet, said movable wall being biased to a position maximizing interior volume of said interior ink chamber whereby a negative pressure is applied to the interior ink chamber;

a spring biasing said movable wall, said spring being disposed between said wall plate and said housing;

wherein said line of sight is parallel to a major surface of said moveable wall whereby a negative pressure is maintained in said interior ink chamber, and a present position of said movable wall is observable at said viewing location from a position outside of said housing, said present position being related to the present volume of ink in said interior ink chamber.

21. The carriage-borne ink reservoir system cartridge of claim 20, wherein said movable wall is movable with respect to said housing in a direction parallel with a direction of movement of a carriage on which said cartridge is to be mounted.

22. The carriage-borne ink reservoir system cartridge of claim 21, further comprising a connector in fluid communication with said interior ink chamber, said connector being adapted to allow connection of a corresponding connector in fluid communication with an ink supply.

23. The carriage borne ink reservoir system of claim 22, wherein said connector comprises a pierceable septum.

* * * * *

UNITED STATES PATENT AND TRADEMARK OFFICE
CERTIFICATE OF CORRECTION

PATENT NO. : 5,754,207
DATED : May 19, 1998
INVENTOR(S) : Gragg et al.

It is certified that error appears in the above-identified patent and that said Letters Patent is hereby corrected as shown below:

At Column 2, line 32, after "collapsible" insert --ink--.

At Column 7, Claim 5, line 22, after "to said", delete "carriage-borne ink reservoir" and insert in lieu thereof --interior ink chamber--.

At Column 7, Claim 5, line 23, after "connector", delete ";and" and insert in lieu thereof --,said fluid conduit being adapted for connecting to--.

At Column 7, Claim 5, line 24, after "stationary position", delete "with respect to said carriage-borne ink reservoir, said off-board ink reservoir being in fluid communication with said carriage-borne ink reservoir via said fluid conduit".

At Column 7, Claim 13, line 58, delete "needles" and insert in lieu thereof --needle,--.

At Column 9, Claim 20, line 4, after "being positioned", delete "portion".

Signed and Sealed this

Fifteenth Day of September, 1998

Attest:

BRUCE LEHMAN

Attesting Officer

Commissioner of Patents and Trademarks